United States Patent [19]

Sase et al.

[11] Patent Number: 5,756,654
[45] Date of Patent: May 26, 1998

[54] PROCESS FOR MANUFACTURING POLYARYLENE SULFIDE

[75] Inventors: Kiyoshi Sase, Ichihara; Kohji Namiki, Sodegaura; Tetsuro Takeya, Chiba, all of Japan

[73] Assignee: Idemitsu Petrochemical Co., Ltd., Tokyo, Japan

[21] Appl. No.: 701,175

[22] Filed: Aug. 21, 1996

[30] Foreign Application Priority Data

Aug. 22, 1995 [JP] Japan ..................... 7-213653

[51] Int. Cl.$^6$ ................................. C08G 75/16
[52] U.S. Cl. ........................... 528/387; 528/388
[58] Field of Search ........................ 528/387, 388

[56] References Cited

U.S. PATENT DOCUMENTS

| | | | |
|---|---|---|---|
| 4,373,090 | 2/1983 | Edmonds | 528/387 |
| 4,910,294 | 3/1990 | Ogata et al. | 528/388 |
| 5,171,831 | 12/1992 | Nesheiwat et al. | 528/388 |
| 5,175,243 | 12/1992 | Ash | 528/388 |

Primary Examiner—Margaret W. Glass
Attorney, Agent, or Firm—Oblon, Spivak, McClelland, Maier & Neustadt, P.C.

[57] ABSTRACT

Disclosed is a process for manufacturing polyarylene sulfide comprising pre-polymerizing a dihalogeno-aromatic compound with a liquid or gaseous sulfur compound in the presence of a lithium compound in an aprotic organic solvent followed by further polymerizing the resulting pre-polymerized system; which is characterized in that sufficient water is added to the pre-polymerized solution (I) to separate it into a tick polymer phase and a solvent phase, then a solvent is added to the thus-separated, thick polymer phase and the resulting polymer phase is further polymerized, for efficiently manufacturing high-purity polyarylene sulfide. The process does not require any complicated steps of washing the polymer with a multi-stage washing system and is free from the increase in the production costs of the polymer. In the process, the lithium salt used can be recovered efficiently.

13 Claims, No Drawings

PROCESS FOR MANUFACTURING POLYARYLENE SULFIDE

BACKGROUND OF THE INVENTION

1. Field of the Invention

The present invention relates to an efficient process for manufacturing polyarylene sulfide (PAS) having a high molecular weight sufficient for the practical use of itself. More precisely, it relates to an efficient process for manufacturing such a high-molecular polyarylene sulfide which is fully applicable to shaping and injection molding into sheets, films, fibers and others and which is especially useful in the field of electric engineering and electronics and also in the field of high-rigidity materials.

2. Background of the Invention

Polyarylene sulfide resins (PAS resins) are thermoplastic resins with thermosettability, excellent chemical resistance, mechanical characteristics and heat resistance over a broad temperature range, and are known especially as high rigidity engineering plastics. PAS resins are useful as materials for electric and electronic parts, appliances, and also as high-rigidity materials for various applications.

A conventional process for manufacturing PAS resins comprises reacting a dihalogeno-aromatic compound such as p-dichlorobenzene with a sodium salt such as sodium sulfide in an aprotic organic solvent such as N-methyl-2-pyrrolidone (NMP). A problem in this process is the difficulty in removing by-product sodium chloride from the resin by washing since sodium chloride is insoluble in the solvents such as NMP and is incorporated in the resins.

A process using a lithium salt, such as lithium hydroxide, instead of the sodium salt is attracting attention as a solution for this problem. Because the lithium chloride by-product in the polymerization reaction in the process is soluble in many aprotic organic solvents (for polymerization) such as NMP, the process using such a lithium salt does not require any additional steps of washing the product with water and post treating the waste liquid and is, therefore, effective in producing high-purity PAS. However, lithium salts are expensive. In order to reduce manufacturing costs of the resins produced using a lithium salt, it is essential to recover and reuse lithium. Accordingly, an invention has been proposed, comprising the step of recovering lithium chloride followed by hydrolyzing it or reacting it with sodium hydrogencarbonate to produce lithium hydroxide (see U.S. Pat. No. 4,451,643), but this process is not always satisfactory with respect to the manufacturing costs of the resins so produced.

On the other hand, the present applicant has already proposed a process for manufacturing PAS having a relatively high molecular weight, which uses such a lithium salt and comprises pre-polymerizing a dihalogeno-aromatic compound with hydrogen sulfide and lithium N-methylaminobutyrate in an aprotic organic solvent up to a conversion of from 80 to 99 mol %, followed by further polymerization of the resulting pre-polymerized system (see Japanese Patent Application Laid-Open (kokai) No. 248077/1994). This process is free from the above-mentioned disadvantages, since lithium chloride is used and recovered. Therefore, this process is advantageous in that it easily gives high purity PAS having a high molecular weight. However, this process requires a multi-staged washing apparatus in order to sufficiently recover the expensive lithium salt, and it cannot be said that this process is always satisfactory.

Accordingly, it is one objective of the present invention to provide a process for economically producing high purity PAS.

A further objective of the present invention is to provide a process which produces PAS using lithium salts where the lithium is effectively recovered for re-use.

A still further objective of the present invention is to provide a process for producing PAS where the lithium is efficiently and economically recovered and re-used.

Still a further objective of the present invention is to provide a process for producing PAS where expensive washing of the PAS to recover the lithium is avoided.

The present invention has been developed in order to fulfill these and other objectives which will become apparent hereafter by providing an efficient process for manufacturing high-purity polyarylene sulfide while reducing the manufacturing costs of the product PAS by omitting the troublesome step of washing the product in a multi-staged washing apparatus and thereby avoids the cost of such multi-stage washing equipment. According to the process, it is intended to efficiently recover the lithium salt used therein and to increase the purity of the product PAS.

SUMMARY OF THE INVENTION

In order to achieve the foregoing objectives, the present invention provides a process for manufacturing polyarylene sulfide comprising pre-polymerizing a dihalogeno-aromatic compound with a liquid or gaseous sulfur compound in the presence of a lithium compound in an aprotic organic solvent followed by further polymerization of the resulting pre-polymerized system, which is characterized in that water is added to the pre-polymerized solution (I) to separate it into a thick polymer phase and a solvent phase, then a solvent is added to the thus-separated, thick polymer phase and the resulting polymer phase is further polymerized to provide a solution (II).

As an additional embodiment of the process of the present invention, water is added to the further-polymerized solution (II) to separate it into a thick polymer phase and a solvent phase, then a solvent is added to the thus separated, thick polymer phase and the resulting polymer phase is still further polymerized. If desired, this additional polymerization cycle is repeated several times.

As another embodiment of the process of the present invention, the amount of water to be added to the pre-polymerized solution (I) is 5/95 or more in terms of the ratio by weight of water to be added to the aprotic organic solvent existing in the pre-polymerized solution (I) (water/aprotic organic solvent). That is, at least 5 weight parts of water are added for every 95 weight parts of aprotic solvent in solution (I).

Yet another embodiment of the process of the present invention, the solvent to be added to the separated, thick polymer phase comprises water and an aprotic organic solvent at a ratio by weight of 5/95 or more in terms of water to the aprotic organic solvent (water/aprotic organic solvent).

DETAILED DESCRIPTION OF THE INVENTION

1. Components (1) Aprotic organic solvents:

The aprotic organic solvent for use in the present invention includes, for example, aprotic, polar organic compounds (e.g., amide compounds, lactam compounds, urea compounds, organic sulfur compounds, cyclic organic phosphorus compounds, etc.). A single solvent of these or a mixed solvent comprising these is preferably used.

As amide compounds among the aprotic, polar organic solvents are N,N-dimethylformamide, N,N-diethylformamide, N,N-dimethylacetamide, N,N-diethylacetamide, N,N-dipropylacetamide, N,N-dimethylbenzoic acid amide, etc.

The lactam compounds include caprolactam, N-alkylcaprolactams, such as N-methylcaprolactam, N-ethylcaprolactam, N-isopropylcaprolactam, N-isobutylcaprolactam, N-n-propylcaprolactam, N-n-butylcaprolactam, N-cyclohexylcaprolactam, etc., and also N-methyl-2-pyrrolidone NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3methyl-2-pyrrolidone, N-ethyl-3-methyl-2-pyrrolidone, N-methyl-3,4,5-trimethyl-2pyrrolidone, N-methyl-2-piperidone, N-ethyl-2-piperidone, N-isopropyl-2-piperidone, N-methyl-6-methyl-2-piperidone, N-methyl-3-ethyl-2-piperidone, etc.

Suitable urea compounds include tetramethyl urea, N,N'-dimethylethylene urea, N,N'-dimethylpropylene urea, etc.

Suitable sulfur compounds include dimethylsulfoxide, diethylsulfoxide, diphenylsulfone, 1-methyl-1-oxosulforane, 1-ethyl-1-oxosulforane, 1-phenyl-2-oxosulforane, etc.; suitable cyclic organic phosphorus compounds are 1-methyl-1-oxophosphorane, 1-n-propyl-1-oxophosphorane, 1-phenyl-1-oxophosphorane, etc.

Essentially any aprotic solvent may be used in this process, with the preferred aprotic solvents being selected from the group consisting of amides, lactams, ureas, organic sulfur compounds and cyclic organic phosphorous compounds.

These aprotic, polar organic solvents can be used either alone or in admixture of two or more of them. Further, it is possible to use these aprotic, polar organic solvents in admixture with other solvents which do not negatively affect the object of the present invention.

Of these aprotic organic solvents, N-alkylcaprolactams and N-alkylpyrrolidones are preferred, with a particularly preferred solvent being N-methyl-2-pyrrolidone.

(2) Lithium compounds:

Essentially any commercially-available high purity lithium compound may be used in the present invention, but preferred are lithium hydroxide and lithium N-methylaminobutyrate.

Preferably, lithium N-methylaminobutyrate is used as described by the present applicant in Japanese Patent Application Laid-Open (kokai) No. 25123/1994 or in Japanese Patent Application No. 11404/1994, which disclosure is incorporated by reference.

According to the process, N-methyl-2-pyrrolidone is first reacted with a hydroxide of an alkali metal except lithium to give an alkali metal salt of N-methylaminobutyric acid (that is, a salt of an alkali metal, except lithium, of N-methylaminobutyric acid). Suitable alkali metal hydroxides include the hydroxides of potassium, sodium, cesium, etc., that is, any alkali metal other than lithium.

Next, water is removed from the reaction mixture containing the alkali metal (except lithium) N-methylaminobutyrate, such as sodium N-methylaminobutyrate, obtained as a result of the previous reaction, to thereby reduce the water content of the mixture. This de-watering step can be conducted according to ordinary means such as distillation or the like. During this step a part of the organic solvent used may be removed with no problem. The thus-produced alkali metal (except lithium) N-methylaminobutyrate, such as sodium N-methylaminobutyrate, is isolated and can be used in the next step. In general, however, it is advantageous to use the de-watered reaction mixture directly or, if desired, after having been processed to have a desired solvent content, in the next step.

Next, the solution comprising the non-lithium alkali metal N-methylaminobutyrate, such as sodium N-methylaminobutyrate, which has been de-watered to have a reduced water content, is brought into contact with lithium chloride, whereby the non-lithium alkali metal N-methylaminobutyrate is reacted with lithium chloride to give the desired lithium n-methylaminobutyrate. This reaction gives, as a side product, a chloride of the non-lithium alkali metal component as derived from the non-lithium alkali metal N-methylaminobutyrate (e.g., sodium N-methylaminobutyrate) used. The by-product alkali metal chloride is removed. Thus is obtained a solution comprising only the desired lithium N-methylaminobutyrate, from which the non-lithium alkali metal component has been removed.

In the present invention, either one or both of lithium hydroxide and lithium N-methylaminobutyrate can be used.

(3) Liquid or gaseous sulfur compounds:

Essentially any liquid or gaseous sulfur compound may be used in the present invention, but preferred is hydrogen sulfide.

(4) Dihalogeno-aromatic compounds:

Essentially any dihalogeno-aromatic compound may be used in the present invention. It is preferred to use compounds previously used in the manufacture of polyarylene sulfide.

Suitable dihalogenobenzenes include m-dihalogenobenzenes, p-dihalogenobenzenes, etc.; alkyl substituted dihalogenobenzenes and cycloalkyl-substituted dihalogenobenzenes, such as 2,3-dihalogenotoluenes, 2,5-dihalogenotoluenes, 2,6-dihalogenotoluenes, 3,4-dihalogenotoluenes, 2,5-dihalogenoxylenes, 1-ethyl-2,5 dihalogenobenzenes, 1,2,4,5-tetramethyl3,6-dihalogenobenzenes, 1-n-hexyl-2,5-dihalogenobenzenes, 1-cyclohexyl-2,5-dihalogenobenzenes, etc.; aryl-substituted dihalogenobenzenes such as 1-phenyl-2,5-dihalogenobenzenes, 1-benzyl-2,5-dihalogenobenzenes, 1-p-toluyl-2,5dihalogenobenzenes, etc.; dihalobiphenyls such as 4,4'dihalobiphenyls, etc.; dihalonaphthalenes such as 1,4-dihalonaphthalenes, 1,6-dihalonaphthalenes, 2,6dihalonaphthalenes, etc.

The plural halogen elements in these polyhalogenoaromatic compounds may be any of fluorine, chlorine, bromine and iodine, and they may be the same or different from each other.

Of these, dihalogenobenzenes are preferred, and those comprising p-dichlorobenzene at 50 mol % or more are more preferred.

(5) Proportion of components:

The aprotic organic solvent and sulfur compound are put into a reactor along with lithium hydroxide and/or lithium N-methylaminobutyrate. The proportion of lithium hydroxide and/or lithium N-methylaminobutyrate to the sulfur compound may be 1/1 in terms of the molar ratio of sulfur atom/lithium atom. The non-reacted sulfur compound is removed prior to the pre-polymerization of the monomer components. For example, where hydrogen sulfide is used as the sulfur compound, the non-reacted compound can be removed by means of bubbling with nitrogen. If desired, a lithium compound such as lithium hydroxide and/or lithium N-methylaminobutyrate can be added to the reaction system.

The proportion of the dihalogeno-aromatic compound to the sulfur compound may be from 0.5 to 2.0, preferably from 0.9 to 1.3, in terms of the molar ratio of dihalogenoaromatic compound/sulfur atom. If it is less than 0.5, the PAS is decomposed, but if it is more than 2.0, the cost for recovering the dihalogeno-aromatic compound is increased.

The molar amount of the dihalogeno-aromatic compound per liter of the aprotic organic solvent may be from 0.8 to 4.0 mols, preferably from 1.2 to 3.7 mols. If it is less than 0.8 mol/liter, the molecular weight of the polymer to be produced is greatly lowered and is difficult to control. If it is more than 4.0 mol/liter, the molecular weight of the polymer is also lowered and the physical values of the resin obtained are no more on the level of practical use.

In the present invention, any suitable branching agent may be used if desired. Preferably the branching agent is selected from active hydrogen-containing halogenoaromatic compounds, more preferably selected from halogeno-aromatic compounds having 3 or more halogen atoms in one molecule and halogeno-aromatic nitro compounds.

The proportion of the branching agent which is optionally used herein may be generally from 0.0005 to 0.05 mols, preferably from 0.001 to 0.02 mols, per mol of hydrogen sulfide used.

2. Polymerization (1) Step of feeding starting components:

In this step, a sulfur compound, lithium hydroxide and/or lithium N-methylaminobutyrate, a dihalogeno-aromatic compound and an aprotic organic solvent are fed into a reactor such as a polymerization reactor.

The order of feeding these components is not critical and any order may be used. The following three alternative sequences when hydrogen sulfide is used as the sulfur compound are typical:

In the first sequence, a solution comprising a dihalogeno-aromatic compound along with lithium hydroxide and/or lithium N-methylaminobutyrate in an aprotic organic solvent is first prepared, into which hydrogen sulfide is introduced and dissolved.

In the second sequence, a solution of hydrogen sulfide in an aprotic organic solvent, which is prepared by introducing hydrogen sulfide in an aprotic solvent with bubbling, is mixed with a dihalogeno-aromatic compound along with lithium hydroxide and/or lithium N-methylaminobutyrate.

In the third possible sequence, hydrogen sulfide is introduced into a solution of lithium hydroxide and/or lithium N-methylaminobutyrate in an aprotic organic solvent and dissolved therein, and thereafter a dihalogeno-aromatic compound is added to the resulting solution.

The temperature of the system into which hydrogen sulfide is introduced with bubbling may be not lower than the temperature at which hydrogen sulfide can be kept gaseous. In general, it is preferably from 0 to 170° C., more preferably from 80° to 150° C., most preferably from 120° to 140° C. If it is higher than 170° C., a solid sulfide will precipitate in the reaction system.

Where hydrogen sulfide is used as the sulfur compound, the pressure under which it is introduced into the system while bubbling may be normal pressure or an increased pressure. The gas-introducing time is not critical and is dependent upon other process parameters. The gas-introducing time and the amount of the gas to be introduced vary, depending on the conditions for the process such as to whether the process is batchwise or continuous, with respect to the proportions of the components to be fed, with respect to the scale of the process, etc. Therefore, the preferred time and amount is not an independent process variable but depends upon such variables as reactor volume, reactant concentration and whether the reaction is continuous or batch. However, the conditions, volumes and rate of introduction, are similar to those conditions used in the art. Where a reactor having a capacity of from 10 to 30 liters is used, it is preferred that the gas-introducing time is approximately from 10 to 180 minutes and that the gas flow rate is approximately from 10 to 1000 cc/min.

After the hydrogen sulfide has been introduced, it is desirable to remove any excess hydrogen sulfide from the system and to de-water the system. The means for the removal of hydrogen sulfide and the dewatering are not critical and any conventional procedure may be used.

For instance, one may use the method of adding to the reaction system a solvent (e.g., toluene, etc.) capable of forming an azeotrope with water to allow for de-watering by distillation and bubbling nitrogen gas through the solution to strip out excess hydrogen sulfide.

(2) Pre-polymerization Step:

According to the present invention, a dihalogeno-aromatic compound is pre-polymerized with a sulfur compound in the presence of lithium hydroxide and/or lithium N-methylaminobutyrate in an aprotic organic solvent. Preferably, the pre-polymerization is effected up to the degree of conversion of the dihalogeno-aromatic compound of falling between 80% and 99%, more preferably between 80% and 95%.

The pre-polymerization itself is well-known and is described in Japanese Patent Application Laid-Open (kokai) No. 248077/1994 and Japanese Patent Application No. 104518/1994, which are incorporated herein by reference. These patent publications disclose a process for manufacturing PAS comprising pre-polymerization followed by final polymerization. The process as disclosed therein is useful in carrying out the prepolymerization of the present invention.

Preferred reaction conditions as disclosed in the patent publications and applicable to the present invention are described hereafter.

To the reaction mixture obtained in the previous step (1), added are a dihalogeno-aromatic compound, water and an aprotic organic solvent, and the resulting mixture is then kept at from 180° to 250° C. for from 0.1 to 10 hours, preferably from 1 to 6 hours. If the reaction time is shorter than 0.1 hours, the reaction does not progress adequately. If it is longer than 10 hours, the reaction does not progress further despite such prolongation of the reaction time, however longer reaction times may be used if desired. It is desirable that the proportions of the polymerizing components satisfy the following conditions.

a. The number of mols of the dihalogeno-aromatic compound to be in one liter of the aprotic organic solvent is preferably from 0.8 to 4.0 (mol/liter), more preferably from 1.2 to 3.7 (mol/liter). If it is less than 0.8 (mol/liter), the molecular weight of the polymer to be produced is greatly lowered and is difficult to control. If it is more than 4.0 (mol/liter), the molecular weight of the polymer is also lowered and the physical values of the resin obtained are no more on the level of practical use.

b. The proportion of the dihalogeno-aromatic compound to mol of the sulfur compound is preferably from 0.5 to 2 mols, more preferably from 0.9 to 1.3 mols. If it is less than 0.5 mols, PAS produced is decomposed. If it is more than 2.0 mols, the cost for recovering the non-reacted dihalogeno-aromatic compound increases, however, one can use more if desired.

c. The ratio by weight of water to the aprotic organic solvent (water/aprotic organic solvent) is preferably 3/97 or more, more preferably from 5/95 to 15/85. If it is less than 3 weight parts of water per 100 weight parts of water plus aprotic solvent are used, the polymerization does not often progress. If it is more than 15/85, i.e., more than 15 weight parts of water per 100 weight parts of aprotic organic solvent plus water, the molecular weight of the polymer to be produced is lowered. In addition, the vapor pressure of the reaction system increases at 260° C. or higher and such is unfavorable in view of the equipment necessary for the reaction.

(3) Step of separating the pre-polymerized system into thick polymer phase and solvent phase:

According to the process of the present invention, the pre-polymerized system is cooled to lower than 100° C., preferably to room temperature, and water is added to the resulting, pre-polymerized solution (I). Sufficient water is added such that the polymerized solution (I) separates into two phases, a thick polymer phase and a solvent phase. Preferably the ratio by weight of the amount of water to be added to solution (I), based upon the total weight of water and aprotic organic solvent in solution (I), is 5 weight parts water to 95 weight parts of water plus aprotic organic solvent in solution (I) or more, i.e., a ratio of 5/95, more preferably a ratio from 5/95 to 15/85. That is, the total amount of water added to polymerized solution (I) preferably comprises from 5 to 15 weight per cent of the total weight of aprotic organic solvent and water after the water has been added to polymerized solution (I). If the ratio is less than 5/95, the pre-polymerized solution (I) may not separate into a thick polymer phase and a solvent phase and it is often impossible to extract lithium chloride out of the solution (I). If the ratio is more than 15/85, the molecular weight of the polymer to be finally obtained is lowered. In addition, the vapor pressure of the reaction system increases at 260° C. or higher in the subsequent reaction and such is unfavorable in view of the equipment necessary for the reaction because of the increased pressure.

The reaction system to which water was added is left static for a while, whereby it is separated into a thick polymer phase and a solvent phase. After this, the thick polymer phase is removed from the reaction tank and is transferred into a different reaction tank. The separation can be conducted in an ordinary manner, such as by simple phase separation. As one preferred embodiment, only the thick polymer phase is taken out of the reaction tank at its bottom.

(4) Step of adding solvent:

The solvent to be added in this step to the thick polymer phase as separated in the previous step comprises water and an aprotic organic solvent. Water and an aprotic solvent are added to the thick polymer phase in such a manner that the concentration of the polymer in the resulting polymer phase, relative to one liter of the aprotic organic solvent added thereto, may be preferably from 0.8 to 4.0 mol/liter, more preferably from 1.2 to 3.7 mol/liter, and that the ratio by weight of water to the aprotic organic solvent added (water/ aprotic organic solvent) may be preferably 5/95 or more, more preferably from 5/95 to 15/85. The solvent to be added may be in the form of a mixed solvent comprising water and an aprotic organic solvent.

(5) Step of final polymerization:

The final polymerization itself in the process of the present invention is not critical and can be those conditions conventionally employed. The conditions as disclosed in Japanese Patent Application Laid Open (kokai) No. 248077/ 1994 are typical, this patent publication is incorporated herein by reference.

a one-liter autoclave (equipped with a paddle blade, capable of stirring at 300 to 700 rpm) made of stainless steel, for example, may be used as the reaction vessel.

The final polymerization is preferably effected at from 200° to 280° C. If the temperature is lower than 200° C., the reaction time is too long, and if it is higher than 280° C., the polymer to be produced may be pyrolyzed, however higher or lower temperatures may be used if desired.

The polymerization time is preferably between 1 hour and 6 hours, although longer or shorter times may be used.

After the final polymerization, the resulting polymer solution (II) may optionally be subjected to the cycle comprising the above-mentioned steps (3) to (5), one or more additional times. As a result of this operation, the polyarylene sulfide formed can have a higher molecular weight with a noticeably reduced lithium content and impurities such as low-molecular components can be removed from the polymer product.

The steps comprising the process of the present invention are more simplified and the lithium compound can be recovered more efficiently than in conventional processes. Thus, the costs for producing the polymer according to the process of the present invention are reduced.

(6) Post-treatment Step:

The polyarylene sulfide as produced in the polymerization process of the present invention mentioned hereinabove can be fractionated and isolated from the reaction system using conventional means. For example, it can be directly fractionated and isolated from the reaction mixture in the reactor through filtration or centrifugation. If desired, a liquid coagulant, such as water and/or a dilute acid, may be added to the reaction mixture, from which the intended polymer product can be fractionated and isolated from the mixture.

To remove, from the thus-isolated polymer, impurities and by-products as adhering thereto, in general, it is desirable that the polymer is washed with a solvent such as water, NMP, methanol, acetone, benzene, toluene or the like.

Without isolating it, the polymer may also be obtained from the reaction mixture by removing and recovering the solvent therefrom through distillation and thereafter washing the resulting residue. The recovered solvent can be reused in the process of the invention.

According to the process of the present invention comprising such simplified steps, it is possible to easily and stably produce a polymer, polyarylene sulfide which has an inherent viscosity ($\eta_{inh}$) of 0.10 or more, preferably 0.17 or more, and a melt index (MI) of from 0 to 1000 g/10 min and which has the desired high molecular weight. The polymer is, as the case may be, capable of forming gel and is granular to have a well-controlled particle size of from 0.5 to 5 mm. If the molecular weight of the polymer as produced according to the process of the invention does not reach the intended value, the cycle comprising the abovementioned steps (3) to (5) may be repeated. The granular polymer to be obtained in the invention is generally in the form of granules but may also be in the form of beads. The inherent viscosity of the granular polymer is obtained by dissolving the polymer, polyarylene sulfide in α-chloronaphthalene at a concentration of 0.4 dl/g followed by measuring the viscosity of the resulting solution with an Ubbelohde's viscometer at 206° C.

The lithium content of the PAS as obtained after one cycle comprising the abovementioned steps (1) to (5), though somewhat varying depending on the conditions under which PAS was produced, is not above 500 ppm by weight. In order to further reduce the lithium content of PAS, the cycle comprising the above-mentioned steps (3) to (5) is repeated plural times as desired. If the lithium content is desired to be 10 ppm by weight, it is sufficient to repeat the cycle twice. After the two-times repetition, one can be expect to attain a yield of the polymer product of 87% by weight or so. Except for the case where the lithium content of the polymer is desired to be specifically reduced to less than 10 ppm, it is always possible to expect the yield of the polymer of 80% or more relative to p-dichlorobenzene(PDCB) used as the starting component Where various articles are desired to be shaped from the polyarylene sulfide as obtained according to the process of the present invention, it is possible to suitably add to the polymer, if desired, other polymers, pigments, fillers such as graphite, metal powder, glass powder, quartz powder, talc, calcium carbonate, glass fibers, carbon fibers, various whiskers, as well as stabilizers, release agents, etc., as is well-known in the art.

The polymer, polyarylene sulfide as obtained according to the process of the present invention can be favorably utilized as a material for various shaped articles, for example, films, fibers, machine parts, electric parts, electronic parts, etc., the same as polyarylene sulfide made the prior art processes.

Other features of the present invention will become apparent in the course of the following description of the exemplary embodiments which are given for illustration of the invention and are not intended to be limiting thereof.

The inherent viscosity of the polymer products obtained in the following examples was measured according to the method mentioned below.

The polymer obtained is dissolved in α-chloronaphthalene at a concentration of 0.4 dl/g and its viscosity (ηinh) is measured with an Ubbelohde's viscometer at 206° C.

EXAMPLES

Example 1

(1.) A mixture comprising 460 ml of N-methyl-2-pyrrolidone (hereinafter referred to as NMP) and 2.31 mols of lithium hydroxide were put into a reactor (I) (this is a one-liter autoclave equipped with a blade stirrer) and heated up to 130° C. While stirring, 2.31 mols of hydrogen sulfide was bubbled into this mixture. The temperature of the liquid into which hydrogen sulfide was bubbled was all the time controlled at 130° C. during the bubbling. Next, this was heated up to 180° C. and toluene was dropwise added to this, which was thus de-watered and subjected to removal of hydrogen sulfide therefrom. Then, this was cooled to room temperature. The sulfur content and the water content of the reaction mixture thus obtained were 1.155 mol/liter and 0.0155 mol/liter, respectively.

(2.) 1.155 mols of p-dichlorobenzene (hereinafter referred to as PDCB), 98 g of NMP and 14 g of water were added to the reaction mixture prepared in the previous step (1), the PDCB concentration in NMP being 2.31 mol/liter and the ratio of water/PDCB being 0.7 (by mol), and the resulting mixture was heated at 240° C. for 30 minutes.

(3.) Next, the mixture was cooled to room temperature, and 76 g of water was added thereto, the ratio of water/NMP being 15/85 (by weight).

(4.) After having been stirred, the mixture was kept static and allowed to separate. The yield of polyarylene sulfide relative to PDCB was 95 mol %, and the inherent viscosity thereof, $\eta_{inh}$ was 0.09. The thick polyarylene sulfide phase was taken out and put into a reactor II (this is of the same type as that of reactor I).

(5.) NMP and water were added to the thick polyarylene sulfide phase, whereby the polyarylene sulfide concentration in NMP became 2.31 mol/liter and the ratio of water/NMP became 15/85 (by weight).

(6.) While stirring, this was heated up to 260° C. and kept at the elevated temperature for 3 hours.

(7.) After having been thus heated, this was cooled, and polyarylene sulfide was recovered. The product polyarylene sulfide had a lithium content of 100 ppm by weight. The yield of the polymer relative to PDCB was 90 mol %, and the inherent viscosity thereof, $\eta_{inh}$ was 0.18. Two reactors were used herein.

Example 2

After the final polymerization (6.) in Example 1, the reaction mixture was kept static to separate it into a thick polyarylene sulfide phase and a solvent phase. The thus separated polyarylene sulfide phase was recovered and put into a reactor III (this is of the same type as that of reactor I). After this, the cycle comprising the steps (5) and (6) in Example 1 were repeated. After having been heated, the resulting reaction mixture was cooled, and PAS recovered.

The product polyarylene sulfide thus obtained had a lithium content of 10 ppm by weight. The yield of the polymer relative to PDCB was 87 mol %, and the inherent viscosity thereof, $\eta_{inh}$ was 0.20. Three reactors were used herein.

Comparative Example 1

The same process as in Example 1 was repeated, except that the steps (3) to (5) were omitted. The product polyarylene sulfide thus obtained had a lithium content of 10000 ppm by weight. The yield of the polymer relative to PDCB was 91 mol %, and the inherent viscosity thereof, $\eta_{inh}$ was 0.18. One reactor was used herein.

Example 3

This example is a modification of Examples 1 and 2, in which used was lithium N-methylaminobutyrate in place of lithium hydroxide.

(1) 258.64 g (0.6 mols) of N-methyl-2-pyrrolidone (NMP) and 178.02 g (1.5 mols) of lithium N-methylaminobutyrate (LMAB) were put into a reactor 1 (this is a one-liter autoclave equipped with a blade stirrer), heated and kept at 130° C. After having confirmed the dissolution of LMAB, gaseous hydrogen sulfide having a purity of 99.9% was bubbled into the resulting solution at a flow rate of 500 ml/min (as measured with a flow meter). The tip of the bubbling nozzle was equipped with a sparger. Along with the bubbling of hydrogen sulfide, nitrogen gas was introduced into the gaseous phase at a rate of 300 ml/min in order to remove the water formed.

After having thus bubbled for 60 minutes under the conditions, the sulfur content of the resulting solution was measured to be sulfur source/LMAB=0.70 (by mol). Analysis of the complex thus formed revealed that the amounts of Li, S and NMP per gram of the complex were $3.909 \times 10^{-3}$ (mol/g) (Li), $2.735 \times 10^{-3}$ (mol/g) (S) and $7.745 \times 10^{-3}$ (mol/g) (NMP), respectively.

(2) 1.05 mols of p-dichlorobenzene (hereinafter referred to as PDCB), 71.21 g of LMAB and 13.24 g of water were added to the reaction mixture prepared in the previous step 1, the ratio of sulfur source/LMAB being 0.5 (by mol) and the ratio of water/PDCB being 0.7 (by mol), and the resulting mixture was heated at 240° C. for 30 minutes.

(3) Next, the mixture was cooled to room temperature, and 56.78 g of water was added thereto, the ratio of water/NMP being 15/85 (by weight).

(4) After having been stirred, the mixture was kept static to be separated into a thick polyarylene sulfide phase and a solvent phase. The polyarylene sulfide phase was recovered. The yield of polyarylene sulfide relative to PDCB was 93 mol %, and the inherent viscosity thereof, $\eta_{inh}$ was 0.10. The thick polyarylene sulfide phase thus separated was put into a reactor II (this is of the same type as that of reactor I).

(5) NMP and water were added to the thick polyarylene sulfide phase, whereby the polyarylene sulfide concentration in NMP became 2.31 mol/liter and the ratio of water/NMP became 15/85 (by weight).

(6) While stirring, this was heated up to 260° C. and kept at the elevated temperature for 3 hours.

(7) After having been thus heated, this was cooled, and polyarylene sulfide was recovered. The product polyarylene sulfide had a lithium content of 100 ppm by weight. The yield of the polymer relative to PDCB was 88 mol %, and the inherent viscosity thereof, $\eta_{inh}$ was 0.19. Two reactors were used herein.

Comparative Example 2

In this comparative example, p-dichlorobenzene was pre-polymerized up to a degree of polymerization of the monomer of being 87%. After having been thus pre-polymerized, the system was de-watered.

Precisely, 86.34 g (0.5873 mols) of p-dichlorobenzene, 138.89 g (1.1982 mols) of lithium N-methylaminobutyrate and a solution of 20.02 g (0.5873 mols) of hydrogen sulfide as dissolved in 300 ml of N-methyl-2-pyrrolidone were put into a reactor I (this is a one-liter autoclave equipped with a blade stirrer) and stirred for 1 hour, while heating at from 140° to 150° C., in a closed system (complex-producing step). Next, this was pre-polymerized for 0.5 hours while heating at 240° C. (pre-polymerization step). After the prepolymerization, this was heated at from 130° to 150° C. in a nitrogen stream, whereby water, N-methyl-2-pyrrolidone and p-dichlorobenzene were taken out of the system through distillation (de-watering step). The amount of the distillate was 86 ml. The p-dichlorobenzene content and the water content of the distillate were analyzed through gas chromatography. The analysis revealed that the degree of polymerization of p-dichlorobenzene was 87% and that the amount of water was 85% (this is relative to the amount of water to be produced in 100% reaction). After the dewatering step, the reaction mixture was further polymerized for 3 hours while heating at 260° C. (final polymerization step).

After the final polymerization, the reaction system was cooled, and the solid precipitate was washed with water in a washing tank I (this is of the same type as that of reactor I) and then with acetone in a washing tank II (this is of the same type as that of reactor I) in that order, and then dried to obtain a polymer product, polyarylene sulfide The viscosity of the product polyarylene sulfide was measured in the same manner as in Example 1, and the inherent viscosity thereof, $\eta_{inh}$ was 0.30. The product was purified. The purified PAS had a lithium content of 500 ppm by weight, and the yield thereof relative to PDCB was 80 mol %.

Comparative Example 3

This is the same as Comparative Example 2, except that the washing of the solid precipitate was conducted four times to thereby reduce the lithium content of the polymer, polyarylene sulfide produced to the same degree as in Example 1. Namely, the solid precipitate was washed with water three times in washing tanks I to III and then once with acetone in a washing tank IV in that order, and then dried to obtain a polymer product, polyarylene sulfide (washing tanks I to IV are of the same type as that of the reactor I).

The polymer product, polyarylene sulfide obtained had a lithium content of 120 ppm by weight, the yield thereof relative to PDCB was 70 mol %, and the inherent viscosity thereof, $\eta_{inh}$ was 0.30. Five reactors were used herein.

Comparative Example 4

This is the same as Example 1, except that the amount of water added to the prepolymerized system was such that the ratio, water/NMP (by weight)=4/96. Since the amount of water added was too small, the pre-polymerized system could not be separated into a thick polymer phase and a solvent phase. Water was further added to the system to be water/NMP=15/85, and the resulting system was further polymerized under the condition and in the same manner as in Example 1.

The Li content of the PAS thus obtained was 10,000 ppm by weight, the inherent viscosity thereof, $\eta_{inh}$ was 0.14, and the yield thereof relative to PDCB was 90 mol %.

Comparative Example 5

The same process as in Example 1 was repeated, except that the ratio of water to NMP (water/NMP) in the solvent to be added to the thick polymer phase, prior to the final polymerization thereof, was 4/96 by weight. Since the ratio, water/NMP was too small, the final polymerization did not progress. Accordingly, there was no difference between the inherent viscosity, $\eta_{inh}$ of the polymer obtained after the pre-polymerization and that of the polymer obtained after the final polymerization. In addition, since the prepolymerized system was not separated into a thick polymer phase and a solvent phase, it was impossible to repeat herein the cycle comprising the above-mentioned steps (3) to (5) for "two-phase separation→addition of solvent→final polymerization," which is one characteristic feature of the present invention. The Li content of the purified PAS was 120 ppm by weight, the inherent viscosity, $\eta_{inh}$ thereof was 0.06, and the yield thereof relative to PDCB was 80 mol %.

The above results verify the following:

(1) Comparing Example 1 and Comparative Example 1, it is understood that the effect of the present invention is attained by the combination of the above-mentioned steps (3) to (5).

(2) Comparing Example 1 and Comparative Example 2, it is shown that the product in the former had a lower lithium content although the number of the reactors used in the former was less by one than that in the latter. (This means that the process of Example 1 is simpler than that of Comparative Example 2 and that the amount of lithium recovered in the former is larger than that in the latter.)

(3) Comparing Example 2 and Comparative Example 2, it is shown that the percentage or recovery of lithium in the former was much larger than that in the latter although the number of the reactors used was the same in both examples.

(4) Comparing Example 1 and Comparative Example 3 where the lithium content of the polymer product obtained was in the same degree, it is understood that the number of the reactors used in the former was obviously smaller than that in the latter. This means that the process of the former is simpler than that of the latter.

(5) From the results of (1) to (4), it is understood that the expensive lithium catalyst used can be recovered more efficiently in the examples of the present invention than in the comparative examples. In consideration of the production equipment to be used in practical operation, the equipment costs for the examples of the present invention are lower than those for the comparative examples since the reactors and the devices to be attached thereto, which are used in the examples of the present invention, can be saved as compared with those which are used in the comparative examples.

As has been described in detail hereinabove with reference to its preferred embodiments, the process of the present invention does not require any complicated steps using a multi-stage washing system and is therefore free from the increase in the equipment costs for the process. Accordingly, it is possible to reduce the production costs according to the process of the present invention. In addition, it is also possible, according to the process of the present invention, to efficiently recover the lithium salt used and to produce a polymer product, PAS with an increased purity. The present invention thus provides an advantageous process for efficiently producing polyarylene sulfide.

Obviously, numerous modifications and variations of the present invention are possible in light of the above teachings. It is therefore to be understood that within the scope of the appended claims, the invention may be practiced otherwise than as specifically described herein.

What is claimed:

1. A process for manufacturing polyarylene sulfide comprising:

(a) pre-polymerizing a dihalogeno aromatic compound with a liquid or gaseous sulfur compound in the presence of a lithium compound and an aprotic solvent to form a pre-polymerized solution (I);

(b) adding sufficient water to the pre-polymerized solution (I) to separate the pre-polymerized solution into a thick polymer phase and a solvent phase and physically separating and removing the thick polymer phase from the solvent phase;

(c) adding a solvent to the separated, thick polymer phase; and (d) subjecting the separated thick polymer phase to which solvent has been added to further polymerization to produce further-polymerized solution (II).

2. The process for manufacturing polyarylene sulfide of claim 1, wherein water is added to the further-polymerized solution (II) to separate it into a thick polymer phase and a solvent phase, then a solvent is added to the thus-separated, thick polymer phase and the resulting polymer phase is still further polymerized, and wherein this additional polymerization cycle is repeated at least once.

3. The process for manufacturing polyarylene sulfide of claims 1 or 2, wherein the amount of water to be added to the pre-polymerized solution (I) is 5/95 or more in terms of the ratio by weight of water to be added to the aprotic organic solvent existing in the pre-polymerized solution (I) (water/aprotic organic solvent).

4. The process for manufacturing polyarylene sulfide of any one of claims 1 or 2, wherein the solvent to be added to the separated, thick polymer phase comprises water and an aprotic organic solvent at a ratio by weight of 5/95 or more in terms of water to the aprotic organic solvent (water/aprotic organic solvent).

5. The process for manufacturing polyarylene sulfide of any one of claims 1 or 2, wherein the solvent to be added to the separated, thick polymer phase comprises water and an aprotic organic solvent wherein the added aprotic organic solvent is such that the resulting polymer concentration in one liter of the solvent is from 0.8 to 4.0 mol/liter and wherein the proportions of water and the added aprotic organic solvent are such that the ratio by weight of water to the added aprotic organic solvent (water/aprotic organic solvent) is from 5/95 to 15/85.

6. The process for manufacturing polyarylene sulfide of claim 1, wherein the lithium compound is lithium hydroxide or lithium N-methylaminobutyrate.

7. A process for manufacturing polyarylene sulfide comprising pre-polymerizing a dihalogeno-aromatic compound with a liquid or gaseous sulfur compound in the presence of a lithium compound in an aprotic organic solvent to form a prepolymerized solution (I) followed by further polymerizing the resulting pre-polymerized system;

wherein a) sufficient water is added to the pre-polymerized solution (I) to separate it into a thick polymer phase and a solvent phase, b) the thick polymer phase and solvent phase are physically separated, and then c) an aprotic solvent and water mixture is added to the thus-separated, thick polymer phase and the resulting polymer phase is further polymerized, wherein the amount of water added to the pre-polymerized solution (I) does not interfere with the subsequent polymerization reaction.

8. The process of claim 7 wherein the aprotic solvent mixture added to said thick polymer phase comprises from 5 to 15 weight per cent water with the remainder aprotic solvent.

9. The process of claim 7 wherein the amount of water added to the pre-polymerization solution (I) is at least 3 weight parts per 97 weight parts of the aprotic solvent or aprotic solvent and water mixture used in the pre-polymerization reaction.

10. The process of claim 9 wherein the aprotic solvent comprises an admixture of 95 to 85 weight parts aprotic solvent and 5 to 15 weight parts water.

11. The process of claim 7, wherein the lithium compound is selected from the group consisting of lithium hydroxide or lithium N-methylaminobutyrate or mixtures thereof.

12. The process for manufacturing polyarylene sulfide of claim 3, wherein the solvent to be added to the separated, thick polymer phase comprises water and an aprotic organic solvent at a ratio by weight of 5/95 or more in terms of water to the aprotic organic solvent (water/aprotic organic solvent).

13. The process for manufacturing polyarylene sulfide of claim 3, wherein the solvent to be added to the separated, thick polymer phase comprises water and an aprotic organic solvent wherein the added aprotic organic solvent is such that the resulting polymer concentration in one liter of the solvent is from 0.8 to 4.0 mol/liter and wherein the proportions of water and the added aprotic organic solvent are such that the ratio by weight of water to the added aprotic organic solvent (water/aprotic organic solvent) is from 5/95 to 15/85.

* * * * *